B. LOOMIS.
PROCESS OF TREATING WOOD AND PLANTS TO MAKE CELLULOSE.
APPLICATION FILED MAR. 22, 1912.
1,122,404.
Patented Dec. 29, 1914.
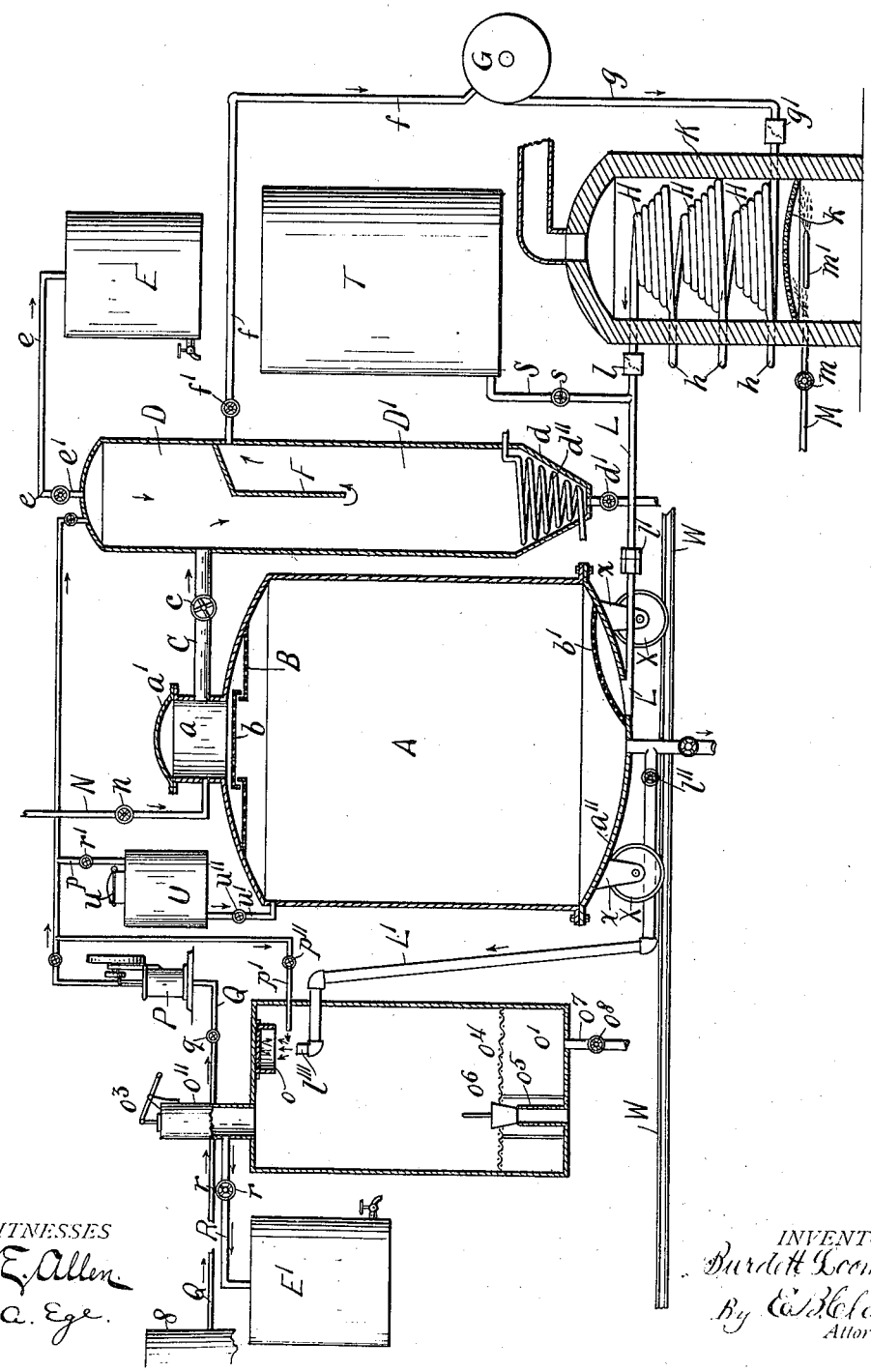

UNITED STATES PATENT OFFICE.

BURDETT LOOMIS, OF HARTFORD, CONNECTICUT, ASSIGNOR TO LOOMIS UTILIZATION COMPANY, OF EAST ORANGE, NEW JERSEY, A CORPORATION OF NEW JERSEY.

PROCESS OF TREATING WOOD AND PLANTS TO MAKE CELLULOSE.

1,122,404. Specification of Letters Patent. Patented Dec. 29, 1914.

Original application filed May 23, 1911, Serial No. 629,053. Divided and this application filed March 22, 1912. Serial No. 685,648.

*To all whom it may concern:*

Be it known that I, BURDETT LOOMIS, a citizen of the United States, residing at Hartford, in the county of Hartford and State of Connecticut, have invented certain new and useful Improvements in Processes of Treating Wood and Plants to Make Cellulose, of which the following is a specification.

This invention relates to the art of treating wood and other fibrous ligneous material, plants, etc., containing lignin, to obtain products and produce pulp and cellulose for the manufacture of paper and other commodities.

The principal object of my invention is to provide a method for economically and rapidly reducing ligneous material and plants to the condition of pulp or cellulose ready for paper making, directly in a beating engine, and at the same time separate and save from the raw material the various valuable constituents in condition for economic uses in the industrial arts, whereby great economy is effected in the process and greatly improved products are obtained.

One of the principal objects of my invention is to provide for the extraction from wood and plants of valuable constituents and products by means of solvent and absorbent vapors and gases, such as fatty acids derived from wood and diffused in hot water and circulated at the proper temperature in contact with the material under treatment, thereby releasing and removing from the material natural constituents, such as turpentine, oils and resinous matter, and subjecting the vapors to condensation for arresting and saving the separated constituents; and thereby effecting economy in the process; and for reducing the ligneous or fibrous material to the best condition for the subsequent action of alkaline substances to produce pulp or cellulose, with a saving of time and a large percentum of alkali ordinarily required; also with a saving of bleaching agent.

Another object is to produce an improved quality of cellulose, with a comparative long, strong fiber from any given kind of ligneous material, and to utilize all, so-called, waste material incident to the process, so as to reduce the cost of the cellulose to the minimum.

Other objects and purposes of my invention will appear and be understood from the following detailed description of the process in connection with drawings which illustrate forms of apparatus which may be used for carrying out the process.

Different kinds of wood and plants contain a variety of constituents, such as acids, gums, wax, turpenes, oils and resinous substances, according to the character or kind of wood or plants, which substances are not useful or desirable in cellulose for making paper or other products, and are, in fact, detrimental thereto,—but which, if separated from the wood and from one another, are quite valuable for use in the arts, and which when separated, leave the fiber of wood or plants in the cleanest and best condition for making superior pulp or cellulose, with a reduced expenditure of time and labor and a reduced percentum of chemicals, heretofore required, for that purpose.

By heating wood to a moderate temperature, ranging between 215° and 245° F., decomposition is set up, resulting in the formation of a number of acids of the fatty acid series, and by raising the temperature there are formed other fatty acids. The formation of fatty acids, among which acetic acid appears in largest quantity, commences, according to Gillot, at 255° F. Other fatty acids are formed, such as formic acid, propionic acid, butyric acid, valeric acid, etc., at the above and higher temperatures.

Simultaneously with the formation of these acids, carbonic acid, carbonic oxid and methane are evolved from the wood, and these bodies in a nascent state may act upon the acids so that the latter may undergo decomposition by more vigorous heating and a large number of products of decomposition may be formed. Among such products are found methyl alcohol (wood spirits), acetone, methyl acetic ether, aldehyde and dimethyl acetal.

I have discovered that these above mentioned fatty acids, gases and other products of decomposition, when diffused in hot water, are an excellent solvent for the cellular structure, the gummy and resinous material found in wood and plants, and that, if the mixture or solution is circulated in contact with the wood or plants to be treated the contained resinous matter, oils and turpentine will be quickly liberated and may be drawn off with circulating water. The turpentine and more volatile oil will pass off in the form of vapor and will be condensed, and the rosin will pass off in a melted semi-liquid condition, and will be deposited and recovered. I have also discovered that the fatty acids and other solvents may be most effectively and economically produced and diffused in water by first heating fresh water and circulating it in contact with the wood or plants to be treated at gradually increasing temperatures, ranging from 212° to approximately 300° F. The volatile solvent is readily extracted from the wood or plants and diffused in the water and the mixture is passed from the wood treating tank through a heater where the temperature is raised and is then circulated up through the wood or plants. The circulation of the water and solvent in contact with the wood or plants and through the heater, the temperature being gradually increased, is continued till the solvent has liberated the turpentine, oil, rosin and gummy matter, and these valuable products have been recovered. The treatment may be continued for six to twelve hours, according to the character of the wood or plants and the temperature of the treating liquor.

By my process the pressure usually required for making pulp or cellulose will be much reduced, the time will be reduced and a smaller percentum of chemical reducing agent will be required to obtain the desired result; and the pulp or cellulose produced will be stronger and have better fiber than that produced by the ordinary process. The pulp or cellulose prepared by my process will also require much less bleaching powder or other agent to completely bleach it, by reason of the fact that the gums and coloring matter have been extracted.

I will now describe my process more in detail by reference to the accompanying drawing, which represents in sectional elevation a form of apparatus in which my process may be carried out.

In the apparatus I provide five principal parts or devices consisting of a treating and distilling tank A, an expansion and depositing chamber D, D', heating coils H located in a furnace below the bottom of tank A, a condenser E, and a pulp disintegrating tank, these parts being suitably connected by valved pipes and a circulating pump being used in the connecting pipes. The closed tank A may be constructed of boiler iron or other suitable sheet metal, and has at the top a mouthpiece $a$ provided with a cover $a'$, and at the bottom a removable cover plate $a''$. At the top of the tank below the mouthpiece is secured a transverse perforated screen plate B, in the middle portion of which is provided an opening and a sliding or removable perforated plate $b$. The plates B and $b$ may be made of perforated sheet metal or strong wire cloth. To the bottom cover is secured a perforated screen $b'$ over the opening for the return circulating pipe L. The bottom cover $a''$ is made removable, and will, in practice, be secured to the tank by bolts. It is preferably mounted by lugs $x$ on wheels X on rails W for convenient removal when the bolts are withdrawn.

To the mouthpiece $a$ is connected a water and vapor discharge pipe C, having a valve $c$, which connects with an expansion and depositing chamber D, D', at the top of which connects a vapor or turpentine discharge pipe $e$ having a valve $e'$. The pipe $e$ leads to a condenser E.

The expansion and depositing chamber D, D' is preferably of greater height than the treating tank and rises above the same and is about one-half the diameter of said tank, though such exact proportions are not required. At the lower end the chamber is made with tapering walls $d$, $d$, terminating with a discharge pipe having a valve $d'$ for drawing off rosin. A steam coil $d''$ is placed in the lower end of the depositing or catch-all chamber D' for melting resinous material in case it becomes cold and hardened. At about middle height of chamber D, D' is placed a separating dome or hood F, which may be attached at its edges to the wall of the chamber. An outlet pipe $f$ connects with the wall of chamber D' at the top of the dome and is provided with a valve $f'$. The dome F is located below the connection of the water and vapor discharge pipe C from treating tank A and provides a vapor expansion chamber or space D above it, and a rosin depositing or catch-all chamber or space D' below it. This dome acts as a deflector and separator to cause the rosin or gummy matter to be deposited in the bottom of chamber D' while the water or treating liquor flows up into the dome and thence off to the circulating pump G. A positively acting rotary pressure pump is preferably used, though some other kind of positive pressure pump may be employed. A discharge pipe $g$ connects with the pump and leads to the lower end of a series of heating coils H suitably supported in a furnace K. These coils are connected in a series by means of return bends $h$ which extend through the wall of the furnace. Near the bottom of the furnace is provided a perforated arch $k$ for distributing the gas flame and protecting the lower heating coil. A fire chamber is provided below the arch $k$. Gas is preferably burned in the fire chamber and is supplied by a pipe M having a valve $m$ and a burner of any suitable kind $m'$ in the fire chamber.

In order to secure satisfactory heating and circulation of liquid through the apparatus, the heater is located so that the top thereof is below the bottom of the treating and distilling tank A. To the top of the heating coil is connected a return pipe L of the circulating system, and this pipe is also connected to the bottom cover $a''$ of the treating tank A. A union coupling $l'$ is preferably used in pipe L so that the cover $a''$ may be readily removed for discharging the contents of tank A. The pipe L is provided with a check valve $l$. A check valve $g'$ is also placed in the lower end of pipe $g$ at its connection with the coil. These check valves prevent back flow of water from the tank. To pipe L is connected a blow-off pipe S, having a valve $s$, and connecting with a storage and settling tank T. A water supply pipe N, having a valve $n$, connects with the mouthpiece of tank A, or may connect at other desired part of the apparatus, as near the heating coils.

A pulp receiving and disintegrating tank O is connected by a blow-off pipe $L'$, having a valve $l''$, to the bottom of tank A, and is provided in its top plate with a target $o$ against which the pulp is blown for separating and disintegrating it. The pipe $L'$ terminates in a nozzle $l'''$ below the target $o$. The tank is also provided at the top with a purge pipe $o''$ having a valve $o^3$ for the escape of vapors. Across the lower end of tank O, about one-fourth of its height from the bottom, is secured a grid and filter cloth $o^4$, providing a compartment $O'$ below for receiving liquor, and to the bottom is connected a drain pipe $o^7$, having a valve $o^8$, for discharging the liquor. A pipe $o^5$ connects with the bottom of the tank and extends up through the grid and filter cloth $o^4$, where its upper end is provided with a plug $o^6$, and this pipe serves for discharging the pulp after having been drained. A gas pipe $p'$, having a valve $p''$ leads from a compression pump P, and connects with tank O just above the pulp discharging nozzle $l'''$ for supplying gas under pressure to carry off much of the watery vapor at the time the pulp is blown against the target $o$, so that much of the black liquor, which would otherwise settle with the pulp onto the filter cloth, will be taken up and carried off with the gas. As a result of this operation there is left less liquor to wash out of the cellulose and, therefore, the cellulose will be much cleaner when removed from the tank.

A compression pump P will be used to draw gas from a holder or hot gas from a heater 8 through pipe Q and will connect by pipe $p$ with the top of the feed tank U and by the branch pipe $p'$, having valve $p''$, with the tank O opening therein just above the nozzle $l'''$. The purge pipe $o''$ will preferably connect by pipe R, having valve $r$, with a condenser E' for separating water or any other condensable matter from the gas. The gas freed from condensable matter will be returned to the holder or to a heater.

An elevated feed tank U for holding alkaline chemical or bleaching liquor is provided adjacent to the treating tank A which may also be used as a digester. Tank U is provided with a cover $u$, and an outlet pipe $u'$ having a valve $u'$, connecting with the top of tank A. A pipe $p$ leading from the compression pump P, and having a valve $r'$, may connect with the top of the tank U for supplying gas under pressure to force the alkaline or bleaching liquor into tank A.

In operating the apparatus for carrying out my process, the bottom cover $a''$ is closed and secured by bolts, and the tank is then filled with chips of wood through the mouthpiece $a$, the sliding screen $b$ being at that time open. The chips are preferably made by cutting the wood across the grain, and may be about an inch thick. The tank A is preferably filled with chips up to the screen B, and then the sliding screen $b$ and the top cover $a'$ are closed and secured in place. Now the whole system, including tank A, chamber D, D' and the coils, is filled with water admitted by pipe N and caused to rise to the level of the discharge pipe C. Gas is then admitted to the burner $m'$ and lighted, and the circulating pump G is started. This causes the circulation of water through the heating coils and thence up through the treating and distilling tank A in contact with the wood chips. As the circulating water becomes heated, approximately to 212° F., some of the fatty acids are produced and pass with the water into the heating coils. As the temperature of the water is gradually raised, other fatty acids, gases and products of decomposition are formed and diffuses through the water. The hot circulating water and the solvent fatty acids soon commence to dissolve the cellular structure and release the turpentine, volatile oil and gummy matter from the wood chips or plants. The turpentine and oil vapor pass with the water or liquor into chamber D, D', where the volatile vapors separate and fill the vapor space D from which they pass off through pipe $e$ to the condenser E, where condensation is effected. At the same time the circulating water containing resin which has been released from the wood or plant material is passed down over the separating dome F, where such resin or gum is separated and caused to settle into the depositing chamber D', where it collects, while the water passes up through the separator dome F and thence by pipe $f$, the circulating pump G, and pipe $g$ into the bottom of the heating coils. By circulating the hot water up through the chips or plant material in tank A, the rosin or gummy matter is carried upward and floated off with the water through pipe C into chamber D, D', where it is deposited.

The circulating hot water or solvent liquor in tank A agitates the body of chips and prevents packing, and continuously carries away the extracted material so as to continuously bring fresh liquor into contact with the chips to effectively exert its solvent action on the cellular structure thereof and release the gummy and resinous constituents. In the expansion and depositing chamber D, D', the turpentine and oil vapor readily separate from the liquor, and at the same time the liquor is partially cooled so that the rosin or gum is hardened and will readily settle in the bottom of chamber D'. The velocity of the flow of liquor is much retarded in the expansion and depositing chamber, thereby facilitating the deposit of rosin. This action is also aided by the small overflow outlet pipe $f$ from the top of the separating dome F.

The temperature of the water or liquor may be gradually raised in the heating coils to approximately 300° F. As the operation progresses, the water or liquor becomes charged with an increasing percentage of fatty acids, gases, etc., and these act with increasing energy to dissolve, release, and extract the turpentine, oil and rosin from the wood chips till they are substantially free from such constituents. The operation may be continued for a period varying from six to twelve hours, according to the character of wood being treated.

At suitable intervals, the valve $d'$ may be opened and the rosin discharged from the chamber D', but this may be mostly discharged at the end of the operation.

When the treatment and distillation of the wood in tank A is completed, the valve $c$ may be closed and the blow-off valve $s$ opened, permitting the water or liquor containing the fatty acid to be blown off into the storage and settling tank T, where it is reserved for treating a succeeding charge of wood chips in tank A. The wood chips or other fibrous material in the treating tank will now be practically free from gum, resin, and oily matter and the pores will be open so as to be readily permeated by caustic-soda solution or other alkaline solution.

The cleaned chips or other fibrous material may be conveniently reduced to cellulose directly in tank A, which now becomes a digester, by admitting fresh water through pipe N and the desired percent of caustic soda solution, or sulfite of soda from tank U. The circulating pump G will be put into operation and the liquor caused to circulate in the direction of the arrows through the heater H and up through the chips till digestion and reduction to pulp or cellulose is completed. The temperature may be raised to 250° F., or higher if required, and at intervals more alkaline solution admitted from tank U. Gas under pressure may be admitted by pipe $p$ into the top of tank U for forcing the alkaline solution into tank A. Owing to the preliminary thorough preparation of the chips, the percentage of caustic soda, sulfite of soda or other chemical used for digesting the wood or other fibrous material, will be very much smaller than that required in the ordinary process. The heat and pressure will be much lower and the time will be much reduced for reducing the material to a good strong fiber pulp or cellulose.

The cellulose having been produced, gas under pressure is supplied from pump to the top of the digester, and then valve $l''$ is opened and the cellulose is discharged through pipe L' and its nozzle $l'''$ against the target $o$ in the top of tank O. Here the particles which adhere together will be disintegrated and separated. At the same time gas under pressure will be admitted through pipe $p'$, just above the discharge nozzle $l'''$, so as to catch the spray of liquor, containing coloring matter and some residue of gummy matter, and carry it out through the purge pipe $o''$. The top valve $o^3$ may be open, so as to blow the gas and vapors into the open air, but the valve $o^3$ will preferably be closed and the gas and vapors conducted by pipe R, its valve $r$ being open, to a condenser E', where the liquor vapor will be condensed, while the gas will be freed and returned to the holder, or to a heater to be again heated and then compressed to be used over again for blowing out colored liquor vapor. Any liquor which drains from the pulp through the filter cloth $o^4$ will be drawn off from compartment O' as required. The pulp or cellulose may be discharged from tank O by opening valve $o^6$ in pipe $o^5$, into a bleaching tank.

The cellulose prepared as above described, freed from gums, resins and much of the coloring matter will be bleached to the desired extent with a comparatively small per cent. of chlorid of lime or other bleaching agent and thus great economy effected, while the cellulose will have greatly increased strength of fiber. The low heat and pressure employed in the digester also contribute to the strength of the fiber in the cellulose.

Owing to the reduced amount of caustic soda and the shorter time required in digesting the prepared chips the fiber of the cellulose will have greater strength than that produced in the usual way.

After reduction of the fibrous material, by digestion with alkali or alkaline salt, to pulp or cellulose, has been completed, that is cooked in the digester A, I may draw off the alkaline liquor through pipe 14, and admit fresh warm or cold water through pipe N to the digester, and circulate such water repeatedly through the cellulose by means of pump G for washing out the alkali and dissolved or saponified oily or resinous matter. The first wash liquor may be drawn off and fresh water again admitted and circulated till the cellulose is sufficiently clean.

Strength, toughness and elasticity are characteristic of the fiber in the cellulose produced by my process.

This application is a division of my copending application, Serial Number 629,053 filed May 23, 1911.

Having described my invention, what I claim, and desire to secure by Letters Patent, is:—

1. The process of making cellulose, which consists in subjecting woody or vegetable fibrous material in a closed chamber to the action of hot water, circulating the water in contact with the material, first at a lower temperature and then at gradually increasing temperatures, separating and collecting the extracted constituents at different stages and temperatures till the material is sufficiently freed from volatile and soluble constituents, drawing off the treating water then adding fresh water and the necessary per cent. of alkaline chemicals and circulating the mixture through the material to digest the same and reduce it to cellulose.

2. The process of treating woody or vegetable fibrous material to make cellulose, which consists in subjecting it in a closed chamber to the action of warm or hot water, circulating the water repeatedly in contact with the material and through a heater, thereby agitating and macerating the material till the natural constitutents are extracted, then drawing off the water and extract, separating the extracted constituents in a depositing chamber during the circulating operation adding to the cleaned material fresh water and an alkaline chemical and circulating the same through and in contact with the material till reduced to cellulose.

3. The process of treating woody or vegetable fibrous material to make cellulose, which consists in first macerating it in a closed chamber with comparatively cold water, circulating the water and gradually raising the temperature in a heater, drawing off and separating extracted constituents at different temperatures, finally drawing off all water and extract, then adding fresh water and alkaline chemical and circulating the mixture through the digester and a heater till the material is reduced to cellulose.

4. The process of making cellulose, which consists in first extracting from woody or vegetable fibrous material, the contained oily, resinous or gummy constituents by treating it with warm water, separating such constitutents thereby cleaning the material, then digesting with an alkaline chemical, then forcing the resulting cellulose by gas under pressure into a receiving tank and discharging it against a target for disintegrating and separating the fiber and at the same time forcing gas under pressure into the disintegrated cellulose and discharging the resulting vapor from the tank and collecting the cellulose in the tank.

5. The process of treating woody or vegetable fibrous material to make cellulose, which consists in subjecting it in a closed chamber to the action of warm or hot water, circulating the water repeatedly up through the material for dissolving and extracting soluble constituents, floating off such constituents with the water and separating them in a deposit chamber drawing off the water and extract, then adding water containing a small per cent. of alkaline chemical and circulating the same in contact with the material for extracting other constituents, and drawing off the resulting watery extract, and thus repeating the operation till the material is cleaned and ready for final digestion with alkali or alkaline salts to reduce to cellulose.

6. The process of treating resinous wood to make cellulose, which consists in subjecting the wood in a closed tank to the action of hot water, thereby forming fatty acids and other solvents, causing the water and acids to circulate in contact with the wood and release the turpentine, oil and rosin, and at the same time distilling off the turpentine and oil vapors and passing the rosin off with the water and separating and collecting the same, then drawing off the treating liquor, and admitting water and alkaline chemical and digesting the chips till reduced to cellulose.

7. The process of treating and distilling resinous wood to obtain products therefrom, which consists in circulating in contact with the wood in a closed tank hot water and fatty acid solvents, thereby releasing from the wood turpentine, oils and rosin, distilling off and condensing the turpentine and oil vapors, and drawing off and collecting the melted and semi-liquid rosin, blowing out the treating liquor and adding fresh water and alkaline chemical and circulating the same through the cleaned material till reduced to cellulose.

8. The process of treating and distilling resinous wood to obtain products therefrom, which consists in subjecting the wood in a closed tank to the action of hot water at a temperature which will develop or form fatty acids, circulating the water and fatty acids diffused therein from the treating tank through a heater and thence in contact with the wood for releasing and extracting turpentine, oils and rosin, distilling off and condensing the turpentine and oil vapors, and carrying off the rosin with the circulating water and collecting it in a separate tank, blowing off the treating liquor, then adding fresh water and alkaline chemical to the cleaned material and digesting the same till reduced to cellulose.

9. In the manufacture of cellulose, substantially in the manner described, the method of separating or disintegrating the fiber and freeing it from dark liquor, which consists in forcing the cellulose by gas under pressure against a target in a receiving tank and at the same time injecting a stream of gas under pressure into the jet of cellulose and the distintegrated cellulose for carrying off the water vapor while the freed cellulose is allowed to settle.

10. The herein described method of disintegrating cellulose and freeing it from black liquor, which consists in forcing the cellulose under pressure against a target and at the same time forcing gas under pressure into the distintegrated material and carrying off the watery portion with the gas and condensing the same and conducting away the separated gas, while the freed cellulose is allowed to settle.

11. The process of treating wood and plant material to make cellulose, which consists in subjecting the material in a closed tank to the action of fatty acid solvents diffused in hot water, circulating the water and solvents through the material for releasing resinous and gummy matter and floating such matter off with the water and causing its deposit in a separate chamber while the water and solvent are again circulated in contact with the material.

12. The process of treating wood and plant material to make cellulose, which consists in circulating water at a sufficiently high temperature through the material to generate or extract fatty acid solvents and thereby release resinous, oily and gummy matter from the material, and carrying such material off with the water and causing its separation and deposit, while the water containing solvent is repeatedly circulated in contact with the material.

In testimony whereof I affix my signature in presence of two witnesses.

BURDETT LOOMIS.

Witnesses:
  E. B. CLARK,
  BURNETT S. JONES.